United States Patent
Schall et al.

(10) Patent No.: US 6,750,282 B1
(45) Date of Patent: Jun. 15, 2004

(54) FLAMEPROOF POLYMER COMPOSITION

(75) Inventors: Norbert Schall, Forstern (DE); Thomas Engelhardt, Freising (DE); Hubert Simmler-Hübenthal, Moosburg (DE); Günter Beyer, Eupen (BE)

(73) Assignee: Süd-Chemie AG, München (DE)

( * ) Notice: Subject to any disclaimer, the term of this patent is extended or adjusted under 35 U.S.C. 154(b) by 0 days.

(21) Appl. No.: 10/204,928

(22) PCT Filed: Mar. 10, 2000

(86) PCT No.: PCT/EP00/02115

§ 371 (c)(1), (2), (4) Date: Apr. 28, 2003

(87) PCT Pub. No.: WO00/68312

PCT Pub. Date: Nov. 16, 2000

(30) Foreign Application Priority Data

May 7, 1999 (DE) .......................................... 199 21 472

(51) Int. Cl.[7] .............................. C08K 3/20; C08K 3/34
(52) U.S. Cl. ....................... 524/445; 523/205; 523/209; 523/212; 523/213; 523/216; 524/434; 524/436; 524/437; 524/447
(58) Field of Search ................................. 523/205, 209, 523/212–213, 216; 524/434, 436, 437, 445, 447

(56) References Cited

U.S. PATENT DOCUMENTS

| | | | |
|---|---|---|---|
| 4,546,126 A | 10/1985 | Breitenfellner et al. | |
| 4,708,975 A | 11/1987 | Shain | |
| 5,091,462 A * | 2/1992 | Fukui et al. | 524/504 |
| 5,206,284 A * | 4/1993 | Fukui et al. | 524/504 |
| 5,773,502 A | 6/1998 | Takekoshi et al. | |
| 6,218,454 B1 * | 4/2001 | Nosu et al. | 524/433 |
| 6,552,112 B1 * | 4/2003 | Redondo et al. | 524/436 |

FOREIGN PATENT DOCUMENTS

| | | |
|---|---|---|
| EP | 0333514 | 9/1987 |
| JP | 55112248 | 8/1980 |
| JP | 62101644 | 5/1987 |
| JP | 62181144 | 8/1987 |
| JP | 63030588 | 2/1988 |
| JP | 63273693 | 11/1988 |
| JP | 11228748 | 8/1999 |
| WO | WO 0066657 | 11/2000 |

OTHER PUBLICATIONS

Gilman & Liechtenhan, "Nanocomposites: A Revolutionary New Flame Refardant Approach," SAMPEJournal, vol. 33 No. 4, 1997, pp. 40–46.

* cited by examiner

*Primary Examiner*—Peter Szekely
(74) *Attorney, Agent, or Firm*—Scott R. Cox

(57) ABSTRACT

The invention relates to a flameproof, essentially halogen-free polymer composition, containing the following: a) 100 parts by weight of a thermoplastic, cross-linkable or cross-linked, elastomeric and/or duroplastic polymer; b) 10 to 200 parts by weight of magnesium, calcium, zink and/or aluminiumhydroxide and/or their double hydroxides; c) 1 to 50 parts by weight of an organic intercalated sheet silicate.

17 Claims, No Drawings

FLAMEPROOF POLYMER COMPOSITION

BACKGROUND OF INVENTION

Apart from a few exceptions, most polymer materials are combustible. It is therefore necessary to modify these polymer materials to make them fire-retardant for many applications such as the construction, furniture, vehicle or electronics industry. To satisfy corresponding regulations or standard tests, organohalogen or organcophorus compounds are added in large amounts as flameproofing agents to plastics (G. Gechta, H. Müller, Plastics Additives Handbook, Hanser Publishers 1993, pp. 708–725).

Organohalogen compounds that are not toxic in themselves can release corrosive pyrolysis components that are hazards to health in the event of a fire. Consequently, there have been numerous attempts to replace these critically evaluated organic flameproofing agents with other organic flameproofing agents, like melamine, or inorganic flameproofing agents. Antimony oxide, red phosphorus, ammonium polyphosphate, and inorganic boron compounds have been used, among others, as flameproofing additives in polymer materials alone or in combination.

Hydroxides of di- and trivalent metals are being increasingly used as fully nontoxic and noncorrosive flameproofing agents. Aluminum and magnesium hydroxide have gained particular significance (G. Kirschbaum Kunststoffe 79, 1989, pp. 1205–1208 and R. Schmidt, Kunststoffe 88, 1998, pp. 2058–2061). Both hydroxides release water in the temperature range between 200–400° C., which absorbs energy by evaporation and therefore leads to cooling of the polymer materials. The smoke density is also reduced.

The very high quality which is necessary in order to make polymer materials flameproof enough that they can pass fire tests is mentioned as a drawback of these hydroxide flameproofing agents. In addition, the extrusion and mechanical properties of these polymer materials, however, deteriorate to a high degree because of the high degree of filling.

Consequently, there has been several attempts to reduce the amount of these hydroxide flameproofing agents by combination with additional organic or inorganic flameproofing agents.

For example, JP 63 273,693-A, JP 63 030,588-A, JP 62 101,644-A as well as EP 333514-A describe flameproof polymer materials and coatings that contain metal hydroxides as flameproofing additives and clay minerals, like kaolin, mica, vermiculite or bentonite or montmorillonite as filler.

JP 55 112,248-A describes flameproof polyolefin materials for cable insulation that contain aluminum hydroxide, zinc borate, calcium carbonate, talc and bentonite in a particle size from 0.01 to 30 μm.

JP 62 181,144 describes flameproof polyester, polypropylene and polyvinyl fluoride films that contain phosphorus-, nitrogen- or halogen-containing flameproofing agents and are coated with a mixture of layer silicates that are swellable in water, like montmorillonite, vermiculite or hectorite with silanes as coupling agent.

Attempts have also been made to improve flameproofing by addition of organically intercalated bentonites or montmorillonites. J. W. Gilmann and J. D. Lichtenhan (SAMPE Journal, Vol. 33, 1997, No. 4, pp. 40–46) describe so-called nanocomposites based on polyamide 6. These materials consist of a polyamide 6 matrix in which montmorillonite particles are dispersed that were intercalated beforehand with aminododecanoic acid. Addition of between 2 and 5% of this nanocomposite filler leads to a reduction of peak-of-heat release (PHR) by up to 63%.

Since adequate flameproofing cannot be guaranteed with organically intercalated layer silicate fillers as the only flame-retardant additives, attempts have also been described to combine organically intercalated clay minerals with other flameproofing agents.

EP 239 986-A describes a non-dripping, flameproof thermoplastic copolyester composition containing 5 to 35% of a flameproofing agent mixture. This mixture contains a bromine- or chlorine-containing compound with at least 50% Br or Cl, 0.2 to 1.5 parts by weight antimony oxide per part by weight of the bromine- and chlorine-containing compound, as well as at least one part by weight of a quaternized bentonite as an antidrip agent, 5 to 100 parts by weight aluminum hydroxide and up to 100 parts by weight calcium carbonate, each based on 100 parts by weight copolyester. Addition of aluminum hydroxide and calcium carbonate is supposed to reduce the smoke density and increase charring.

U.S. Pat. No. 5,773,502 describes a non-dripping, flameproof thermoplastic polyester material that contains the following flameproofing additives: 5 to 20 wt % halogen-containing organic flameproofing agent, 1 to 5 wt % antimony oxide, 0.25 to 5 wt % of an organophilic clay and 0.02 to 2 wt % of a fluorine-containing polymer.

GB-A 1 14 174 describes a polymer composition that contains 0.5 to 50 wt % of a flameproofing agent and up to 10 wt % of a bentonite modified with organic cations in addition to the base polymer (polyamide, polystyrene or polyolefin). Phosphoric acid esters, antimony trioxide or arsenic trioxide are used as flameproofing agents in addition to halogenated organic compounds. The use of magnesium, calcium or aluminum hydroxide as flameproofing agents is not described.

EP 132 228-A describes flame-resistant reinforced polyester molding compounds with 3 to 50 wt % reinforcing filler (preferably glass fibers), 5 to 30 wt % of a flame-resistant additive, 0.2 to 4 wt % of an optionally organically modified layer silicate as an antidrip agent and 0.05 to 2 wt % of an alkali metal salt of a monocarboxylic acid with 6 to 22 carbon atoms. Quaternized bentonites, like Bentone® 27, 34, 38 are preferably used as antidrip agents. Appropriate flameproofing additives are preferably organic halogen compounds alone or in combination with antimony trioxide. However, there is no indication of the use of hydroxides as flameproofing additives.

All the mixtures described above, including organically modified. Layer silicates and additional flameproofing additives have the common feature that these mixtures contain more or less toxic components and/or corrosive components in the event of a fire.

Flameproof halogen-free polymer compositions are known from EP 0 893 469-A that contain a mixture of different polymers or copolymers and an inorganic filler, like aluminum trihydrate or magnesium hydroxide.

SUMMARY OF INVENTION

It has now surprisingly been found that a synergistic flameproofing effect occurs for flameproofed polymer mixtures that contain essentially no additional organohalogen or organophosphorus flameproofing agents, if they contain in addition to metal hydroxides, organically intercalated layer silicates and optionally other inorganic flameproofing agents.

The object of the invention is therefore a flameproof, essentially halogen-free, polymer composition containing:

a) 100 parts by weight of a thermoplastic, crosslinkable or crosslinked elastomeric and/or thermosetting polymer;

b) 10 to 200 parts by weight magnesium, calcium, zinc and/or aluminum hydroxides and/or their double hydroxides;

c) 1 to 50 parts by weight of an organically intercalated layer silicate.

The layer spacing of the organically intercalated layer silicate in the polymer is preferably at least 10% greater than that of the original layer silicate.

DETAILED DESCRIPTION OF THE INVENTION

The development objective was to prepare flameproof polymer compositions in which the use of organic halogen compounds and organic phosphorus compounds are dispensed with since such substances release toxic and/or corrosive gases in the event of fire.

"Essentially halogen-free" is understood according to the invention to mean polymer compositions whose halogen content (referring to low-molecular halogen compounds) is less than 5 wt %, preferably less than 2 wt %. If the polymers are halogen-containing polymers (for example, PVC), their halogen content is not considered here.

By omitting the organohalogen compounds, an improvement in the mechanical properties and charring is surprisingly achieved.

The effect according to the invention is probably based on the fact that the layer spacing determined by x-ray of the organically intercalated layer silicate is widened by the incorporation of the polymer molecules and that the organic halogen compounds are bound to the layer silicates so that they can no longer act as radical scavengers in the gas phase in the event of fire and the radical chain reactions that occur during combustion can run undisturbed. Use of an additional amount of the organically intercalated layer silicates without simultaneous use of an organohalogen compound causes a significant improvement in mechanical properties with comparable flameproofing properties, and also an improvement in charring.

The hydroxides or double hydroxides of magnesium, calcium, zinc and/or aluminum used according to the invention liberate water exclusively in the event of fire and therefore do not form toxic or corrosive smoke products. Moreover, these hydroxides are in a position to reduce the smoke density in the event of fire.

The employed polymer (a) according to the invention is preferably chosen from polyolefins (like polyethylenes, polypropylenes or polybutenes); vinyl polymers (like Polyvinyl chloride or polyvinylidene chloride); styrene polymers, polyacrylonitrile; polyacrylates and methacrylate; natural and synthetic rubbers; fluorine plastics (like tetrafluoroethylene or polyvinyl fluoride), thermoplastic polycondensates (like polyamide, polyesters, polycarbonates, polyethylene terephthalate); thermosetting polycondensates (like phenol-formaldehyde plastics, urea-formaldehyde plastics, melamine-formaldehyde plastics, unsaturated polyester resins, silicone resins, polyimide); thermosetting and thermoplastic polyadducts (like epoxy resins, polyurethanes and isocyanate resins); co- or terpolymers, as well as graft polymer from them; and their mixtures.

A summary of appropriate plastics can be found in Hans Domininghaus "Plastics and their properties," second edition, VDI Verlag, pp. 7 to 11.

In order to achieve a flameproof finishing required for different applications, the percentage of hydroxide (b) is preferably about 30 to 80 wt %. At higher percentages of filling, the mechanical properties of the corresponding polymer materials deteriorate unacceptably. The tensile strength and breaking elongation, which is important for cable insulation in particular, also decline to an unacceptable degree.

However, it was surprisingly found that the amount of added flameproofing hydroxides (b) can be substantially reduced if organically intercalated layer silicates (c) are incorporated in the polymer mixtures as additional flameproofing additives. A synergistic effect is found between the organically intercalated layer silicate and the flameproofing hydroxides. For example, by addition of 5 wt % of the organically intercalated layer silicates, the aluminum hydroxide fraction can be reduced by 15% so that with improved flameproofing, higher breaking elongation and reduced processing viscosity occurs.

The metal hydroxides (b) preferably have a specific surface area of 3 to 150 $m^2/g$, especially 3 to 50 $m^2/g$ and an average particle size of about 1 to 20 $\mu$m, preferably about 1 to 10 $\mu$m.

The metal hydroxides (b) can be modified on the surface, for example, hydrophobized, for example with silane.

Swellable smectites, like montmorillonite, hectorite, saponite or beidellite are preferably used as the starting materials for the organically intercalated layer silicates (c).

The organically intercalated layer silicates have a layer spacing of about 1.5 to 4 nm. These layer silicates are preferably intercalated with quaternary ammonium compounds, protonated amines, organic phosphonium ions and/or aminocarboxylic acids.

Preferably about 1 to 100 parts by weight of additional halogen-free flameproofing additives can also be added, like antimony oxide, red phosphorus, zinc sulfide, melamine derivatives, organophosphorus compounds and/or inorganic boron compounds.

The invention is explained by the following examples.

EXAMPLES 1 to 8

1. Employed Starting Materials

Polymer: 4 parts by weight low-density polyethylene (Escorene® LLN 1001 XV from Exxon)+1 part by weight ethylene vinyl acetate copolymer (EVA Escorene® UL 00328 from Exxon)

Organically intercalated layer silicate: (manufacturer described below)

Aluminum hydroxide: Martinal® OL 104LE (Martinswerk) Magnesium hydroxide: Magnifin® H 5 (Martinswerk)

2. Production of the Organically Intercalated Layer Silicate 2.5 kg of dry natural sodium bentonite (Volclay® SPV) is stirred into 100 L of demineralized water using an agitator. The suspension is agitated for 24 hours at room temperature. The suspension is then heated at 85° C. and a solution heated to 80° C. containing 1.6 kg dimethyldistearylammonium chloride and 30 L demineralized water also under vigorous mixing is metered over a period of 60 minutes. After addition of the intercalation components is complete, the mixture is further agitated for 5 hours at 85° C. The suspension, cooled to 50° C., is then introduced to a filter chamber press, filtered off and washed with 1000 L demineralized water. The obtained precipitate is then dried for 24 hours in a forced-air furnace at 110° C. The dried product is then ground with an impact mill to a particle size of <63 $\mu$m. The layer spacing determined by x-ray is 2.8 nm.

3. Production of Polymer Compounds

Powdered, intercalated layer silicate, aluminum hydroxide and magnesium hydroxide and optionally additional powdered additives are initially mixed manually and then introduced with the polymer granulate gravimetrically to a laboratory kneader (MDK 46 with 11 L/D from the Buss Co., Switzerland) and compounded at a temperature of about 150° C. for aluminum hydroxide and 220° C. for magnesium hydroxide. The amount is 10 kg/h. The compounded mixture is withdrawn as a double strand from the compounding machine, cooled via a water bath and then cut in a granulator to a granulate with a diameter of 2 to 3 mm and a length of 2 to 5 mm. The obtained granulate is then dried for 10 hours at 90° C. in a forced-air furnace.

4. Extrusion of Samples

The dried granulate is extruded to a strip about 3 mm thick on a single-screw extruder from the Leistritz Co., Nurnberg in order to produce samples to determine the mechanical properties.

5. Cone-calorimeter Test

According to ASTM E 1345 and ISO 5660. The plates for the cone experiments were produced on a press from the Schwabenthan Co.

6. Determination of Mechanical Properties

Determination of the tensile E modulus occurred according to DIN 53457 with a tensile rate of 1 mm/min.

Determination of tensile strength (TS) occurred according to DIN 53455.

Determination of breaking elongation (BE) occurred also according to DIN 53455.

Determination of the melt flow index (MFI) occurred according to DIN 53735.

7. Determination of LOI (Limiting Oxygen Index)

Determination of LOI occurred according to ISO 4589, part 2.

The composition and the results for examples 1 to 8 are shown in Table 1. Examples 1, 2, 4 and 6 are comparative examples without $Al(OH)_3$ or without organically intercalated layer silicate. Comparative example 8 contains no organically intercalated layer silicate and no hydroxide. The values for PHR, Ti and breaking elongation are much poorer for these examples than those in examples 3, 5 and 7 according to the invention.

TABLE 1

| Example | 1 | 2 | 3 | 4 | 5 | 6 | 7 | 8 |
|---|---|---|---|---|---|---|---|---|
| Polymer | 100.00 | 45.00 | 45.00 | 45.00 | 45.00 | 45.00 | 45.00 | 100.00 |
| $Al(OH)_3$ | | 55.00 | 55.00 | 40.00 | 40.00 | | | |
| $Mg(OH)_2$ | | | | | | 55.00 | 55.00 | |
| Ogranically intercalated layer silicate | 5.00 | | 5.00 | | 5.00 | | 5.00 | |
| PHR ($KW/m^2$) | 488 | 202 | 105 | 302 | 189 | 191 | 85 | 1215 |
| TI (s) | 72 | 128 | 174 | 124 | 175 | 212 | 287 | 32 |
| ASSEA ($m^2/kg$) | | 3150 | 1600 | 3900 | 1810 | 3700 | 1850 | |
| LOI | 21 | 32 | 34 | 27 | 29 | 36 | 39 | 19 |
| TS (MPa) | 19 | 15 | 14 | 13.5 | 13 | 14 | 13 | 20 |
| BE (%) | 650 | 250 | 240 | 320 | 300 | 220 | 200 | 600 |
| MFI (g/10 min) | 4.0 | 2.2 | 2.0 | 2.8 | 2.6 | 2.0 | 1.9 | 4.0 |

PHR    Peak of heat release
TI    Time to ignition
ASSEA    Average specific smoke extinction area
TS    Tensile strength
BE    Breaking elongation
MFI    Melt flow index at 150° C. with 21.6 kg

EXAMPLES 9 to 11

The procedure of examples 1 to 8 was followed with the deviation that the polymer mixture according to these examples was used together with bis(tert-butylperoxyisopropyl)benzene as a crosslinking agent (Peroxan® ( BIB) in a 100:6 ratio.

The composition and results are shown in Table 2. Comparative examples 9 and 10 show poorer PHR, BE and TI values relative to example 11, which is prepared according to the invention. The absence of $Al(OH)_3$ in comparative example 9 leads to particularly poorer results.

TABLE 2

| | Crosslinked mixture. | | |
|---|---|---|---|
| Example | 9 | 10 | 11 |
| Polymer | 100.00 | 45.00 | 45.00 |
| $Al(OH)_3$ | | 55.00 | 55.00 |
| Organically intercalated layer silicate | 5.00 | | 5.00 |
| PHR ($KW/m^2$) | 450 | 190 | 98 |
| TI(s) | 70 | 121 | 165 |
| ASSEA ($m^2/kg$) | | 3030 | 1580 |
| LOI | 21 | 32 | 34 |
| TS(MPa) | 20 | 17 | 15 |
| BE (%) | 480 | 190 | 160 |

EXAMPLES 12 to 19

The procedure of examples 1 to 8 was followed with the deviation that a polyamide was used as the polymer for examples 12 to 15 (Grilamide® L16L from EMS Chemie) and a polystyrene as polymer for examples 16 to 19 (Vestyron® 106 by Hüls).

The composition and results are shown in Table 3. Comparative examples 12, 13, 15, 16, 17 and 19 show poorer PHR and TI values relative to examples 14 and 18 which are prepared according to the invention. The absence of $Mg(OH)_2$ in comparative examples 12, 15, 16 and 19 leads to particularly poorer results.

TABLE 3

Thermoplastic mixture.

| Example | 12 | 13 | 14 | 15 | 16 | 17 | 18 | 19 |
|---|---|---|---|---|---|---|---|---|
| Polymer | 100.00 | 45.00 | 45.00 | 100.00 | 100.00 | 45.00 | 45.00 | 100.00 |
| Mg(OH)$_2$ | | 55.00 | 55.00 | | | 55.00 | 55.00 | |
| Organically intercalated layer silicate | 5.00 | | 5.00 | | 5.00 | | 5.00 | |
| PHR (KW/m$^2$) | 450 | 190 | 100 | 1060 | 400 | 180 | 120 | 1170 |
| TI (s) | 70 | 135 | 182 | 35 | 69 | 135 | 170 | 42 |

EXAMPLES 20 to 24

The procedure of examples 1 to 8 was followed with the deviation that polypropylene grafted with maleic anhydride (Fusabond® MDS11-D from DuPont) was used as the polymer. The comparative examples 22 and 23 also contained decabromodiphenyl oxide (Adine® 102 from Atochem) and Sb$_2$O$_3$ as flameproofing agents in a weight of 1:3. Example 20, which was prepared according to the invention, gave much better PHR and TI values than the comparative examples.

The composition and results are shown in Table 4.

TABLE 4

| Example | 20 | 21 | 22 | 23 | 24 |
|---|---|---|---|---|---|
| Polymer | 45.00 | 100.00 | 80.00 | 80.00 | 100.00 |
| Bromine containing flameproofing agent | | | 20.00 | 20.00 | |
| Al(OH)$_3$ | 40.00 | | | | |
| Organically intercalated layer silicate | 5.00 | 5.00 | | 5.00 | |
| PHR (KW/m$^2$) | 770 | 945 | 825 | 940 | 2050 |

What is claimed is:

1. A flameproof, essentially halogen-free, polymer composition comprising
    100 parts by weight of a polymer selected from the group consisting of a thermoplastic, crosslinkable or crosslinked, elastomeric and thermosetting polymers or mixtures thereof; wherein the polymer is selected from the group consisting of polyolefins; vinyl polymers; styrene polymers; polyacrylonitrile; polyacrylates and methacrylates; natural and synthetic rubbers; fluorine plastics; thermoplastic polycondensates; thermosetting polycondensates; thermosetting and thermoplastic polyadducts; co-or terpolymers as well as graft polymers from them; and their mixtures,
    from about 10 to about 200 parts by weight of a metal hydroxide selected from magnesium, calcium, zinc or aluminum hydroxide or double hydroxides or mixtures thereof wherein said metal hydroxide has a specific surface area of from about 3 to about 150 m$^2$/g and an average particle size from about 1 to about 20 μm; and
    from about 1 to abut 50 parts by weight of an organically intercalated layer silicate prepared from a precursor layer silicate.

2. The composition of claim 1 wherein layer spacing of the organically intercalated layer silicate is at least about 10 percent greater than that of the precursor layer silicate.

3. The composition of claim 1 wherein the metal hydroxide has a specific surface area of from about 3 to about 50 m$^2$/g and an average particle size from about 1 to about 10 μm.

4. The composition of claim 1 wherein the metal hydroxide is surface modified.

5. The composition of claim 1 wherein the metal hydroxide is hydrophobized.

6. The composition of claim 1 wherein the precursor layer silicate is selected from the group consisting of montmorillonite, hectorite, saponite or beidillite.

7. The composition of claim 1 wherein the organically intercalated layer silicate has a layer spacing from about 1.5 to about 4 nm.

8. The composition of claim 1 wherein the precursor layer silicate is intercalated utilizing a material selected from the group consisting of a quaternary ammonium compound, a protonated amine, an organic phosphonium ion, an aminocarboxylic acid or combinations thereof.

9. The composition of claim 1 further comprising from about 1 to about 100 parts of a halogen-free flameproofing additive selected from the group consisting of antimony oxide, red phosphorus, zinc sulfide, melamine, organophosphorus compounds, inorganic boron compounds and mixtures thereof.

10. A flameproof, essentially halogen-free, polymer composition comprising
    100 parts by weight of a polymer selected from the group consisting of a thermoplastic, crosslinkable or crosslinked, elastomeric and thermosetting polymers or mixtures thereof; wherein the polymer is selected from the group consisting of polyolefins; vinyl polymers; styrene polymers; polyacrylonitrile; polyacrylates and methacrylate; natural and synthetic rubbers; fluorine plastice; thermoplastic polycondensates; thermosetting polycondensates; thermosetting and thermoplastic polyadducts; co-or terpolymers as well as graft polymers from them; and their mixtures,
    from about 10 to about 200 parts by weight of a metal hydroxide selected from magnesium, calcium, zinc or aluminum hydroxide or double hydroxides or mixtures thereof; and
    from about 1 to abut 50 parts by weight of an organically intercalated layer silicate prepared from a precursor layer silicate, wherein the precursor layer silicate is intercalated utilizing a material selected from the group consisting of a quaternary ammonium compound, a protonated amine, an inorganic phosphonium ion or combinations thereof.

11. The composition of claim 10 wherein layer spacing of the organically intercalated layer silicate is at least about 10 percent greater than that of the precursor layer silicate.

12. The composition of claim 10 wherein the metal hydroxide has a specific surface area of from about 3 to about 150 m$^2$/g and an average particle size from about 1 to about 20 μm.

13. The composition of claim 10 wherein the metal hydroxide has a specific surface area of from about 3 to about 50 m$^2$/g and an average particle size from about 1 to about 10 μm.

14. The composition of claim 10 wherein the metal hydroxide is surface modified.

15. The composition of claim 10 wherein the metal hydroxide is hydrophobized.

16. The composition of claim 10 wherein the precursor layer silicate is selected from the group consisting of montmorillonite, hectorite, saponite or beidillite.

17. The composition of claim 10 wherein the organically intercalated layer silicate has a layer spacing from about 1.5 to about 4 nm.

* * * * *